(12) United States Patent
Kolbenschlag

(10) Patent No.: US 10,746,317 B2
(45) Date of Patent: Aug. 18, 2020

(54) VALVE

(71) Applicant: SAMSON AG, Frankfurt am Main (DE)

(72) Inventor: Stefan Kolbenschlag, Darmstadt (DE)

(73) Assignee: SAMSON AG, Frankfurt am Main (DE)

( * ) Notice: Subject to any disclaimer, the term of this patent is extended or adjusted under 35 U.S.C. 154(b) by 442 days.

(21) Appl. No.: 15/382,663

(22) Filed: Dec. 17, 2016

(65) Prior Publication Data

US 2017/0175917 A1    Jun. 22, 2017

(30) Foreign Application Priority Data

Dec. 18, 2015    (DE) .................. 10 2015 122 229

(51) Int. Cl.
  *F16K 31/06*    (2006.01)
  *F16K 11/24*    (2006.01)
  (Continued)

(52) U.S. Cl.
  CPC ...... *F16K 31/0665* (2013.01); *F15B 13/0405* (2013.01); *F15B 13/0442* (2013.01);
  (Continued)

(58) Field of Classification Search
  CPC ............ F16K 31/0665; F16K 31/0693; F16K 31/082; F16K 31/022; F16K 11/24;
  (Continued)

(56) References Cited

U.S. PATENT DOCUMENTS 2,891,577 A * 6/1959 Stewart, Jr. ........ B60G 17/0155
                                                137/595
3,396,751 A    8/1968 Bender
(Continued)

FOREIGN PATENT DOCUMENTS

DE        19945183        3/2001
DE     112004001507       1/2007
(Continued)

OTHER PUBLICATIONS

European Patent Office, European Search Report, dated Apr. 18, 2017, p. 1-7, Applicant: Samson AG, Application No. 16201798.2.
German Patent and Trademark Office, Examination Report, dated Aug. 24, 2016, p. 1-10, Application No. 102015122229.9, Applicant: Samson AG.

*Primary Examiner* — Craig J Price
*Assistant Examiner* — Andrew J Rost
(74) *Attorney, Agent, or Firm* — Woodling, Krost and Rust

(57) ABSTRACT

The invention relates to a valve (10, 50, 52) for operating a pressurizing medium driven actuator of a process control valve for technical process equipment, comprising a valve seat (14) in a basic valve body (48), a closing body (12) and an electromagnetic drive (18, 30), which closing body (12) is ball -shaped and cooperates with a valve seat (14) so as to block the flow from an inlet side to an outlet side, said closing body (12) cooperating with a piston surface (20) which can be moved within a piston chamber (25) connected to the inlet side, characterized in that a connecting element (17) is provided between the closing body (12) and the piston surface (20) which is actively connected to an armature (18) of an electromagnetic linear direct drive, with a coil assembly (30) being embedded in the basic valve body (28) and a magnetic field with alternating polarity in the axial direction being present at the armature (18).

6 Claims, 2 Drawing Sheets

Figure 1:
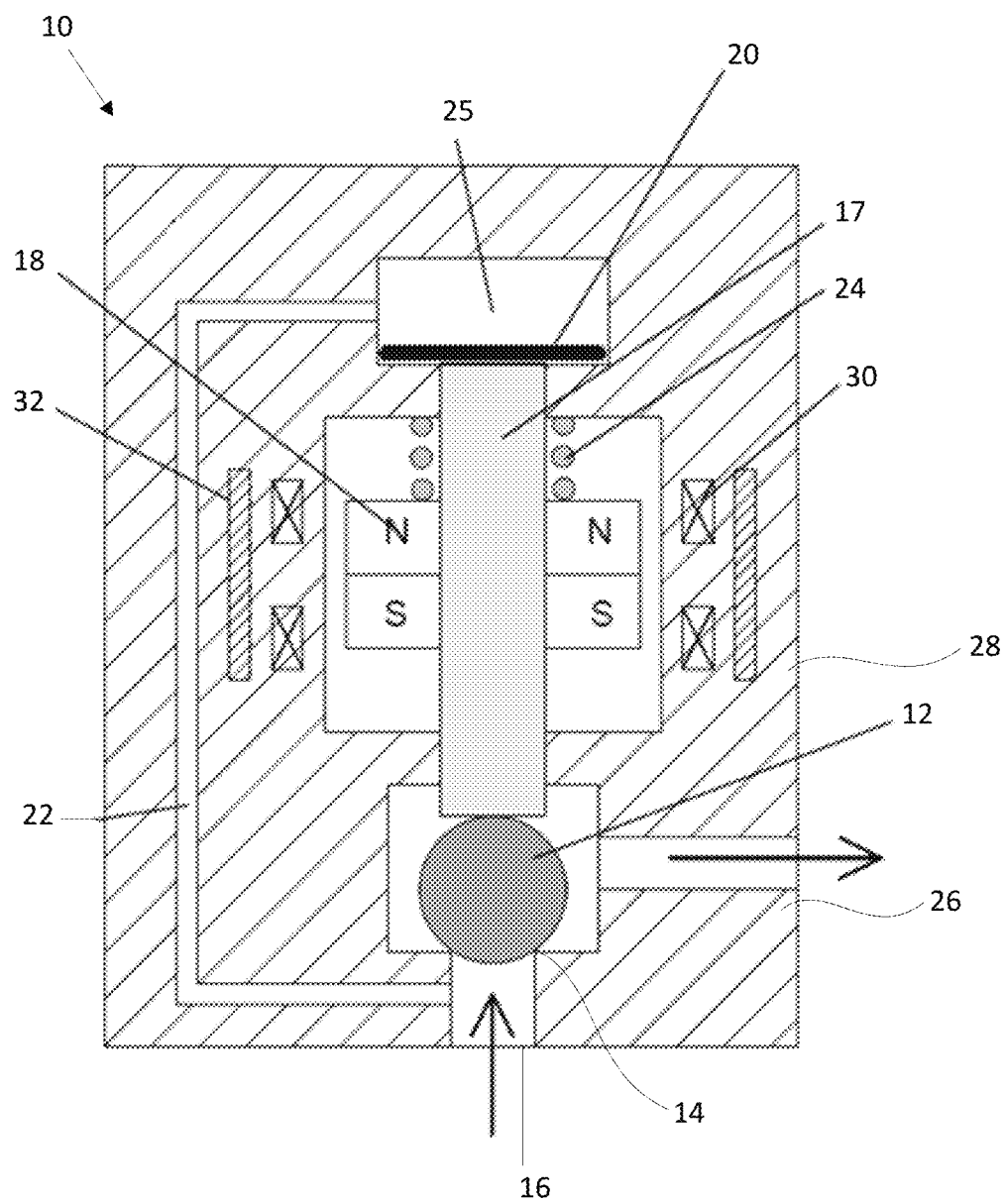

(51) Int. Cl.
*F16K 31/08* (2006.01)
*F16K 39/02* (2006.01)
*F15B 13/04* (2006.01)
*F15B 13/044* (2006.01)
*G01L 7/16* (2006.01)

(52) U.S. Cl.
CPC .......... *F16K 11/24* (2013.01); *F16K 31/0693* (2013.01); *F16K 31/082* (2013.01); *F16K 39/022* (2013.01); *G01L 7/16* (2013.01); *F15B 2211/30575* (2013.01); *F15B 2211/327* (2013.01)

(58) Field of Classification Search
CPC .............. F16K 31/0679; F15B 13/0442; F15B 13/0405; F15B 2211/30575; F15B 2211/327; G01L 7/16
USPC ............... 137/596, 596.1, 596.2, 613, 627.5, 137/625.65, 625.46, 628, 629, 596.14, 137/596.16
See application file for complete search history.

(56) References Cited

U.S. PATENT DOCUMENTS

| | | | |
|---|---|---|---|
| 3,714,868 A * | 2/1973 | Kowalski | F15B 11/006 91/420 |
| 4,982,803 A | 1/1991 | Kervagoret | |
| 5,393,132 A | 2/1995 | Yogo et al. | |
| 5,609,400 A * | 3/1997 | Hashida | B60T 8/364 137/596.17 |
| 6,588,857 B2 * | 7/2003 | Sim | B60T 8/363 251/129.14 |
| 2009/0159135 A1 | 6/2009 | Kolbenschlag | |
| 2014/0123846 A1 | 5/2014 | Kolbenschlag et al. | |

FOREIGN PATENT DOCUMENTS

| | | |
|---|---|---|
| DE | 102009015231 | 10/2010 |
| DE | 202012010675 | 1/2013 |
| EP | 2073089 | 6/2009 |

* cited by examiner

VALVE

This patent application claims the benefit and priority of and to German patent application serial no. 10 2015 122 229.9 filed Dec. 18, 2015. German patent application serial no. 10 2015 122 229.9 filed Dec. 18, 2015 is incorporated herein by reference hereto in its entirety.

The invention relates to a valve for operating a pressurizing medium driven actuator of a process control valve for technical process equipment.

DE 199 45183 DE discloses a direct operated valve having a valve seat which can be closed by means of a ball. The ball is held in a de-energized position by a pre-loaded spring. Fluid from a pressure chamber connected to the high-pressure side acts on the ball, thus pressure-balancing the latter. The valve is operated by an electromagnetic tappet which is mounted diametrically relative to the pressure chamber. In addition, the aforementioned document discloses a 3/2-way valve assembly.

DE 10 2009 015 231 A1 discloses a dosing valve for flowing media, in particular a glue nozzle and/or glue valve, having a regulating or closing element which can be adjusted by at least one magnet, in particular a permanent magnet, which magnet or permanent magnet is at least partially provided with a coating and/or cover that is resistant to the medium and does not impair the power of the magnet.

Disclosed in DE 11 2004 001 507 T5 is a valve for controlling and/or regulating a fluid flow, which valve comprises a housing defining a chamber intended to cause and/or improve fluid interaction between the fluid supply and the device that can be operated.

It is the object of the invention to achieve the response behavior of the valve at reduced power consumption, and to provide a valve assembly which has improved control characteristics.

In a known manner, a valve for operating a pressurizing medium driven actuator of a process valve for technical process equipment comprises a valve seat in a basic valve body, a closing body and an electromagnetic actuator, wherein said closing body is ball-shaped and cooperates with a valve seat so as to block the flow from an inlet side to an outlet side. The closing body cooperates with a piston surface which can be moved within a piston chamber that is connected to the inlet side of the valve.

Pressure compensation with the inlet side is achieved via the piston surface, which thus reduces the required driving force.

The invention is characterized in that a connecting element is provided between the closing body and the piston surface, which connecting element is operatively connected to an armature of an electromagnetic linear direct drive, wherein the coil arrangement is embedded in the basic valve body and there is a permanent magnetic field at the armature with alternating polarity in an axial direction. Owing to this operative connection, movement of the armature causes an axial movement of the piston surface. In its simplest form, the connecting element may be implemented by a rigid connection, for example by a piston rod.

The valve according to the invention may be a regulating valve, a control valve, or a regulating/control valve.

Integrating the electromagnetic drive between the closing element and the piston chamber will reduce the inert mass of the actuator assembly, which in turn results in higher dynamics at reduced power consumption.

In particular, a magnetic return structure is incorporated in the valve housing on the side facing away from the connecting element. This allows the valve to be controlled effectively.

In an advantageous manner, the connection for compensating pressure from the valve inlet side to the piston chamber may notably pass through the housing of the basic valve body outside of the magnetic return structure. This leaves a maximum piston surface and can be implemented more easily in manufacturing, because it does not require drilling a through hole through the closing body for example which is preferably in the form of a hardened ball. The piston surface can thus be designed as a uninterrupted surface. This will increase the effective pressure compensation surface at reduced mass. Consequently, this will also reduce the amount of energy required for operation.

Moreover, the tappet which is not affected by the fluid may have constant magnetic properties throughout its operation, regardless of the fluid. This yields higher efficiency in the conversion of electrical energy into mechanical movement.

As an armature, the electromagnetic actuator preferably comprises a permanent magnet ring, an electromagnetic coil and a magnetically conducting return pipe which extends around the coils.

More specifically, the permanent magnet rings are firmly connected to the tappet.

In another advantageous embodiment of the invention, a spring may be connected in an axial direction which defines a defined zero-drive valve position. This spring is used to position the closing body in a zero-current "open" state or "closing" state.

Preferably, the basic valve body is essentially made from a solid body.

In a preferred embodiment of the invention, the valve is a proportional throttle valve.

Preferably, the active surfaces of the valve may be matched to each other in such a way that they differ in size in the closing state, in the closing direction and against the closing direction.

This will allow a pressure measurement to be performed for which the closing element will not be in a rest position in the closing position but has to be energized in this position for a pressure measurement to be performed in a "just closed" state. The current introduced into the coil will then be proportional to the power required to cause the closing bodies to just close or open.

In another aspect, the invention relates to a valve assembly comprising first and second valves, as described above, in a basic valve body, wherein a basic valve body has a first fluid connection which is connected to the inlet side of the first valve, and which has a second fluid connection on the outlet side of the first valve, and fluidically in parallel to the latter, the inlet side of the second valve is connected to the outlet side to the first valve, with the basic valve body having a third fluid connection which is located on the outlet side to the second valve.

Arranging the two valves in one housing allows a high degree of precision to be obtained in the overlap of transition areas between the elementary switching states which will be explained later by way of example.

The fact that the two valves of the valve assembly can be controlled independently of each other results in improved control characteristics in the transition area.

The first valve is designed as an opening assembly and the second valve is designed as a closing assembly.

Preferably, the first fluid connection is a supply port, the second fluid connection is an exhaust port, and the third fluid connection is a vent port which in particular vents against atmospheric pressure.

This allows three operating states to be implemented in a simple manner in single acting pressurizing medium driven actuators, i.e. airing, venting and holding. During airing, the exhaust air valve is held in a closed position against its preload, and the supply air valve is held in an open position against its preload. During venting, the exhaust air valve is in an open position, supported by the spring force, with the supply air valve being held in a closed position, supported by the spring force. This also corresponds to the safety position in the zero-current state. During holding, both the supply air valve and the exhaust air valve are in a closed state. While the terms supply air and exhaust air are used to describe in particular the direction of pressurization, they are not intended to necessarily restrict the subject matter to its use in combination with air as a pressurizing medium but can be understood to comprehensively relate to other fluids which can be used as pressurizing media. However, a pneumatic arrangement is to be regarded as a special case within the scope of the invention.

Common valve assemblies for controlling a pressurizing medium driven process control valve are designed as piston valves. To fulfill the requirements of a high leakage class, such an assembly needs to be manufactured with the utmost precision, which makes it very expensive.

Providing a closing body which is ball-shaped on its side facing the valve seat may ensure a simple design of a tight closing valve.

The valve assembly can be advantageously used for controlling a pressurizing medium driven process control valve, in particular of the single acting type, with a vent hole.

Furthermore, the valve assembly can be used as a pressure sensor.

For this purpose, the active surfaces of each throttle valve are designed to differ in size in the closing direction and against the closing direction.

Pressure can be measured by connecting a second connection (exhaust air) to an actuator of a process control valve to be controlled having position detection.

For determining the pressure, the actuator is aired (pressure increase) with the vent valve closed, until the closing element of the controlled process control valve just starts to move, i.e. until a movement is detected.

Then the supply air valve is made to assume the closing position, and the exhaust air valve is opened for a long enough period—by reducing the supply of electrical power—to cause the controlled process control valve to move in the opposite direction.

Based on the electrical power present at the first and second valves, in particular the actuation currents, the pressure present in each case can be calculated in this balanced state. The person of skill in the art will know how to correctly calculate the pressures as a function of spring pre-load, active surfaces and drive power. Pressure can thus be measured both during airing and during venting. Because of the option to control the first and second valves separately, and the knowledge of the pressures, it is also possible to simultaneously open both the first valve, in particular the supply air valve, and the second valve, in particular the exhaust air valve, in certain ratios in the area of the reversal points so as to reverse the movement of the actuator to be controlled in a shock-free and as fast as possible manner. Such a reversal of the movement can be brought about at the respective end positions or also at random positions of the drive position. In this way, it is also possible to more sensitively approach a target position. This reduces overshoots as well as the number of vibrations during adjustment, due to the fact that the valves can be controlled separately and the pressure ratios can be determined.

The invention allows a precise and inexpensive valve assembly for controlling a fluid flow from an inlet port to an outlet port and a vent port.

Additional advantages, features and possible applications of the present invention can be gathered from the description which follows, in which reference is made to the embodiments illustrated in the drawings.

Throughout the description, the claims and the drawings, those terms and associated reference signs are used as are indicated in the list of reference signs which follows below. In the drawings, FIG. 1 is a schematic sectional view of a direct operated 2/2-way valve; and FIG. 2 is a schematic sectional view of a valve assembly according to the invention.

FIG. 1 is a schematic sectional view of a direct operated 2/2-way valve 10. The valve 10 comprises a closing body 12 which is ball-shaped. In a closed position, the closing body 12 engages a valve seat 14 and thus blocks the path from the supply port 16 to the exhaust port 26. The closing body 12 is driven by a tappet 17 which latter is firmly connected to a permanent magnet 18 in an axial direction. On one end which faces away from the closing body 12, the tappet 17 has a piston surface 20 which can be supplied with the fluid of the supply port 16 via a feed line 22 incorporated in the basic valve body 28, thus enabling depressurized operation of the valve 10. The piston 20 is accommodated in a piston chamber 25. In order to define a current-free safety position, a pressure spring 24 pre-loads the valve in its closing position in a safety position. For operating the valve 10, a coil assembly 30 is integrated in the basic valve body 28, which, when supplied with current, will cause the tappet 17 to move axially. For increasing the efficiency of the drive, a tubular magnetic return structure 32 is provided which surrounds the coil assembly 30. The feed line 22 integrated in the basic valve body 28 extends outside the magnetic return structure 32. In this way, a highly compact and efficient 2/2-way valve 10 has been created.

Figure 2:
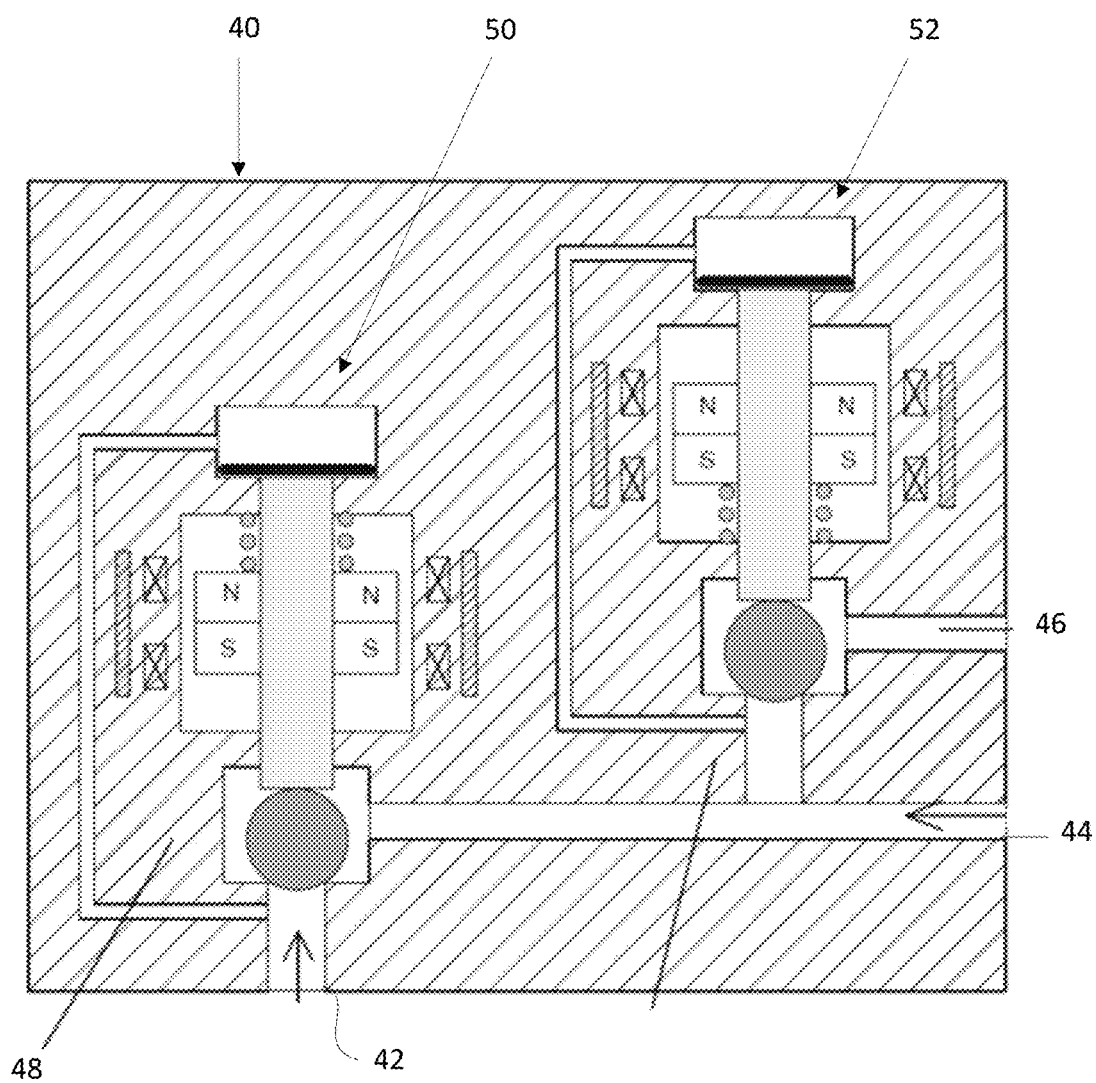

FIG. 2 is a schematic sectional view of a valve assembly 40 according to the invention in the form of a 3/2-way valve which is used to regulate a single acting process control valve 54. The valve assembly 40 comprises a supply port 42, an exhaust port 44 and a vent port 46. Moreover, the valve assembly 40 comprises a basic valve body 48 which accommodates a first valve 50 and a second valve 52. The supply port 42 has its inlet side connected to the first valve 50. On the outlet side to the first valve 50, the inlet side of the second valve 52 and, in parallel thereto, the exhaust port 44 is connected to the first valve. Provided on the outlet side of the second valve 52 is the vent port 46. The first valve 50 corresponds in design to the description with reference to FIG. 1 and is pre-loaded in its closing position. The second valve 52 likewise essentially corresponds to the assembly of FIG. 1, with the spring being arranged such that the open position is the safety position so that in the safety position, the exhaust port 44 will be vented and the supply port 42 will be blocked. This state corresponds to the vent position. For airing, the second valve 52 will be in its closed position, and the first valve 50 will be in its open position. For maintaining a pressure that is present at the exhaust port 44, those valve positions will be assumed as are illustrated in FIG. 2. Both the first and second valves are in the closing position there.

In this embodiment, the exhaust port 44 of the first valve 50 is connected to the pressurizing medium driven actuator of a single acting process control valve 54 which can be controlled by means of the first valve 50.

The compact arrangement of the valves and their efficient design allows a precise adjustment to be made with little energy, in particular in the transition areas between the above mentioned states, thus achieving improved control characteristics.

LIST OF REFERENCE SIGNS 10 valve
12 closing body
14 valve seat
16 supply port
17 tappet
18 permanent magnet
20 piston surface
22 feed line
25 piston chamber
26 exhaust port
24 pressure spring
28 basic valve body
30 coil assembly
32 magnetic return structure
40 valve assembly
42 supply port
44 exhaust port
46 vent port
48 basic valve body
50 valve
52 valve
54 process control valve

What is claimed is:

1. A valve assembly for operating a pressurizing medium driven actuator of a process control valve for technical process equipment, comprising:
   a basic valve body (48);
   first and second valves (50, 52) reside within said basic valve body;
   each of said first and second valves (50, 52) includes:
   an inlet and an outlet;
   an electromagnetic drive (18, 30);
   said electromagnetic drive includes a coil assembly and an armature;
   said coil assembly is embedded in said basic valve body (48);
   a magnetic field with alternating polarity in an axial direction is present at said armature (18);
   a valve seat (14) in said basic valve body (48);
   a closing body (12);
   each closing body (12) is a ball and said ball cooperates with said valve seat (14) so as to block flow from said inlet to said outlet;
   a piston chamber (25);
   a piston, said piston has a piston surface (20);
   said piston and said piston surface reside in said piston chamber (25);
   said ball cooperating with said piston surface (20), said piston movable within said piston chamber (25);
   a feed line connects said piston chamber and said inlet;
   a connecting element (17) between said ball and said piston surface (20); and,
   said connecting element (17) is affixed to said armature (18) of said electromagnetic drive;
   said basic valve body (48) has a first fluid port (42), said first fluid port is connected to said inlet of said first valve (50);
   said basic valve body (48) includes a second fluid port (44);
   said inlet of said second valve (52) is connected to said outlet of said first valve (50);
   said outlet of said second valve (52) is connected to a third fluid port (46); and,
   said first valve includes a spring residing between said basic valve body and said armature urging said ball against said valve seat (14).

2. The valve assembly as claimed in claim 1 wherein said first fluid port (42) is a supply port, said second fluid port (44) is an exhaust port and said third fluid port (46) is a vent port.

3. The valve assembly as claimed in claim 1, wherein:
   said second valve includes a spring residing between said basic valve body and said armature urging said connecting element away from said valve seat (14).

4. The valve assembly as claimed in claim 1, wherein:
   said electromagnetic drive includes a magnetic return embedded in said basic valve body.

5. The valve assembly as claimed in claim 4, wherein:
   said first and second valves include said feed line within said basic valve body residing radially outwardly of said magnetic return and communicating pressure from said inlet side to said piston chamber (25) enabling said valve assembly to be compact.

6. The valve assembly as claimed in claim 1, wherein said armature is a permanent magnet.

* * * * *